US010969165B2

(12) United States Patent
Saunders et al.

(10) Patent No.: US 10,969,165 B2
(45) Date of Patent: *Apr. 6, 2021

(54) MICRO BOOSTER SUPERMARKET REFRIGERATION ARCHITECTURE

(71) Applicant: Emerson Climate Technologies, Inc., Sidney, OH (US)

(72) Inventors: Michael A. Saunders, Sidney, OH (US); Rajan Rajendran, Centerville, OH (US); Kurt Knapke, Minster, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/868,636

(22) Filed: Jan. 11, 2018

(65) Prior Publication Data

US 2018/0195773 A1    Jul. 12, 2018

Related U.S. Application Data

(60) Provisional application No. 62/445,580, filed on Jan. 12, 2017.

(51) Int. Cl.
*F25D 29/00* (2006.01)
*F25B 1/10* (2006.01)
(Continued)

(52) U.S. Cl.
CPC .............. *F25D 29/008* (2013.01); *F25B 1/10* (2013.01); *F25B 5/02* (2013.01); *F25B 7/00* (2013.01);
(Continued)

(58) Field of Classification Search
CPC .. F25D 29/008; F25B 7/00; F25B 1/10; F25B 2400/075; F25B 41/043; F25B 40/00
See application file for complete search history.

(56) References Cited

U.S. PATENT DOCUMENTS 4,326,387 A    4/1982    Friedman
4,530,215 A    7/1985    Kramer
(Continued)

FOREIGN PATENT DOCUMENTS

CN    101688697 A    3/2010
CN    101815868 A    8/2010
(Continued)

OTHER PUBLICATIONS

Helmut et al., Air Conditioning Device . . . , May 22, 2014, DE102012022564A1, Whole Document (Year: 2012).*
(Continued)

*Primary Examiner* — Larry L Furdge
(74) *Attorney, Agent, or Firm* — Harness, Dickey & Pierce, P.L.C.

(57) ABSTRACT

A refrigeration system includes first and second compressors, a condenser, first and second evaporators, and a valve. The first compressor is fluidly connected to first suction and discharge lines. The second compressor is fluidly connected to second suction and discharge lines. The second suction line is fluidly connected to the first discharge line. The condenser receives refrigerant from the second compressor. The first evaporator receives refrigerant from the condenser and discharges refrigerant to the first suction line. The second evaporator receives refrigerant from the condenser and discharges refrigerant to the second suction line. The valve is disposed between the first evaporator and the first suction line. The first suction line receives refrigerant when the valve is in a first position. The second suction line receives refrigerant when the valve is in a second position. The first compressor is bypassed when the valve is in the second position.

14 Claims, 8 Drawing Sheets

(51) Int. Cl.
*F25B 7/00* (2006.01)
*F25B 41/04* (2006.01)
*F25B 43/02* (2006.01)
*F25B 49/02* (2006.01)
*F25B 5/02* (2006.01)
*F25B 40/00* (2006.01)

(52) U.S. Cl.
CPC .............. *F25B 41/04* (2013.01); *F25B 43/02* (2013.01); *F25B 49/02* (2013.01); *F25B 40/00* (2013.01); *F25B 41/043* (2013.01); *F25B 2400/0401* (2013.01); *F25B 2400/075* (2013.01); *F25B 2400/13* (2013.01); *F25B 2400/22* (2013.01); *F25B 2600/2501* (2013.01); *F25B 2600/2513* (2013.01); *F25B 2700/197* (2013.01); *F25B 2700/21152* (2013.01); *F25D 2400/14* (2013.01); *F25D 2400/36* (2013.01); *F25D 2700/10* (2013.01)

(56) References Cited

U.S. PATENT DOCUMENTS

| | | | |
|---|---|---|---|
| 5,094,598 | A | 3/1992 | Amata et al. |
| 5,440,894 | A | 8/1995 | Schaeffer et al. |
| 5,685,168 | A | 11/1997 | Sada |
| 6,047,557 | A | 4/2000 | Pham et al. |
| 7,386,994 | B2 | 6/2008 | Chang et al. |
| 8,561,425 | B2 | 10/2013 | Mitra et al. |
| 8,950,206 | B2 | 2/2015 | Caillat |
| 9,021,823 | B2 | 5/2015 | Caillat |
| 9,416,993 | B2 | 8/2016 | Hong |
| 9,625,183 | B2 | 4/2017 | Wallace et al. |
| 2003/0066302 | A1 | 4/2003 | Ueno |
| 2005/0235660 | A1 | 10/2005 | Pham |
| 2005/0279111 | A1 | 12/2005 | Moriwaki |
| 2006/0117776 | A1 | 6/2006 | Choi et al. |
| 2006/0201175 | A1* | 9/2006 | Shapiro ................ A47F 3/0482 62/246 |
| 2007/0119196 | A1 | 5/2007 | Wellman |
| 2008/0087031 | A1 | 4/2008 | Park et al. |
| 2008/0092572 | A1 | 4/2008 | Kim |
| 2008/0245086 | A1* | 10/2008 | Schenkel ................ F25D 13/04 62/228.1 |
| 2009/0090113 | A1 | 4/2009 | Caillat |
| 2009/0107169 | A1 | 4/2009 | Yoon et al. |
| 2010/0186439 | A1 | 7/2010 | Ogata et al. |
| 2010/0247348 | A1* | 9/2010 | Taguchi ................ F04B 39/12 417/410.1 |
| 2011/0155816 | A1 | 6/2011 | Jeong et al. |
| 2011/0209485 | A1 | 9/2011 | Lifson et al. |
| 2011/0239667 | A1 | 10/2011 | Won et al. |
| 2011/0314863 | A1 | 12/2011 | Mitra et al. |
| 2012/0011866 | A1 | 1/2012 | Scarcella et al. |
| 2012/0023978 | A1 | 2/2012 | Chae et al. |
| 2012/0186284 | A1 | 7/2012 | Choi et al. |
| 2012/0216551 | A1 | 8/2012 | Minor et al. |
| 2012/0227426 | A1* | 9/2012 | Deaconu ................ F25B 1/10 62/115 |
| 2012/0291464 | A1 | 11/2012 | Yoon et al. |
| 2012/0304685 | A1 | 12/2012 | Kiguchi |
| 2013/0098092 | A1 | 4/2013 | Wakamoto et al. |
| 2014/0037484 | A1 | 2/2014 | Fraser et al. |
| 2014/0056725 | A1 | 2/2014 | Fraser et al. |
| 2014/0208785 | A1* | 7/2014 | Wallace ................ F25B 9/008 62/115 |
| 2014/0238060 | A1 | 8/2014 | Tamaki et al. |
| 2014/0290288 | A1 | 10/2014 | Burns et al. |
| 2014/0326008 | A1 | 11/2014 | Yoon et al. |
| 2014/0377102 | A1 | 12/2014 | Caillat |
| 2015/0007598 | A1 | 1/2015 | Choi et al. |
| 2015/0044070 | A1 | 2/2015 | Zhang et al. |
| 2015/0114013 | A1 | 4/2015 | Joo et al. |
| 2015/0168044 | A1 | 6/2015 | Lim et al. |
| 2016/0178250 | A1 | 6/2016 | Jeung et al. |
| 2016/0265821 | A1 | 9/2016 | Kimura et al. |
| 2016/0313041 | A1 | 10/2016 | Pham et al. |
| 2017/0108250 | A1 | 4/2017 | Song et al. |
| 2018/0051921 | A1 | 2/2018 | Ho et al. |
| 2018/0180338 | A1 | 6/2018 | Honda et al. |
| 2018/0195773 | A1 | 7/2018 | Saunders et al. |
| 2018/0195781 | A1 | 7/2018 | Saunders et al. |
| 2018/0195794 | A1 | 7/2018 | Saunders et al. |

FOREIGN PATENT DOCUMENTS

| | | | |
|---|---|---|---|
| CN | 101842646 A | | 9/2010 |
| CN | 102388279 A | | 3/2012 |
| DE | 102012022564 A1 | * | 2/2014 |
| EP | 1775528 A1 | | 4/2007 |
| EP | 2088388 A1 | | 8/2009 |
| EP | 3024107 A1 | | 5/2016 |
| KR | 20130081403 A | | 7/2013 |

OTHER PUBLICATIONS

European Communication under Rules 161(2) and 162 EPC dated Aug. 21, 2019 in European Application 18738742.8.
European Communication under Rules 161(2) and 162 EPC dated Aug. 21, 2019 in European Application 18738609.9.
Non-Final Office Action regarding U.S. Appl. No. 15/868,712 dated Jul. 23, 2019.
Non-Final Office Action regarding U.S. Appl. No. 15/868,693 dated Aug. 9, 2019.
Notice of Allowance regarding U.S. Appl. No. 15/868,712 dated Jan. 23, 2020.
Final Office Action regarding U.S. Appl. No. 15/868,693 dated Mar. 13, 2020.
European Search Report regarding European Application No. 201664265-1008, dated May 15, 2020.
Non-Final Office Action regarding U.S. Appl. No. 15/868,693, dated Jul. 1, 2020.
International Search Report of the ISA/KR for International Application No. PCT/US2018/013603 dated Apr. 27, 2018.
Written Opinion of the ISA/KR for International Application No. PCT/US2018/013603 dated Apr. 27, 2018.
International Search Report of the ISA/KR for International Application No. PCT/US2018/013608 dated Apr. 23, 2018.
Written Opinion of the ISA/KR for International Application No. PCT/US2018/013608 dated Apr. 23, 2018.
First Chinese Office Action regarding Application No. 201880011732.7 dated Sep. 14, 2020. English translation provided by Unitalen Attorneys at Law.

* cited by examiner

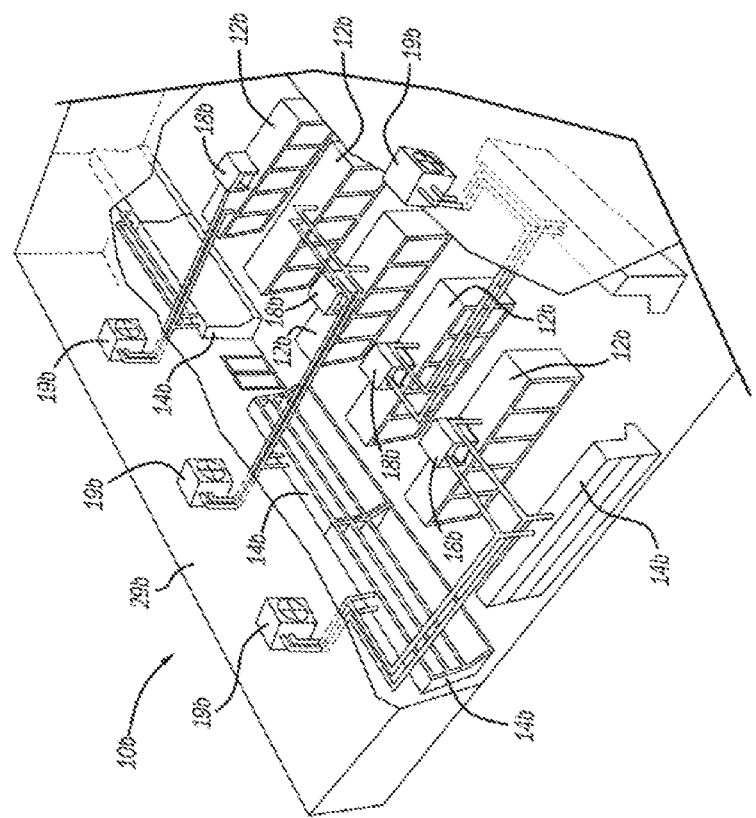

MICRO BOOSTER SUPERMARKET REFRIGERATION ARCHITECTURE

CROSS-REFERENCE TO RELATED APPLICATIONS

This application claims the benefit of U.S. Provisional Application No. 62/445,580, filed on Jan. 12, 2017. The entire disclosure of the above application is incorporated herein by reference.

FIELD

The present disclosure relates to a micro booster supermarket refrigeration system.

BACKGROUND

This section provides background information related to the present disclosure which is not necessarily prior art.

Supermarket refrigeration systems may include low temperature refrigeration cases and medium temperature refrigeration cases. Refrigeration cases are cooled by evaporators that discharge low pressure refrigerant vapor to respective compressors. Medium temperature evaporators discharge an intermediate pressure refrigerant to a medium temperature compressor and the medium temperature compressor discharges a high pressure refrigerant. Low temperature evaporators discharge a low pressure refrigerant to a low temperature compressor and the low temperature compressor discharges a high pressure refrigerant. Thus, the low temperature compressor operates with a relatively high compression ratio because it needs to bring the refrigerant to a condensing pressure.

Supermarket refrigeration systems may include distinct low and medium temperature compressors, pumps and heat exchangers when secondary refrigerants are used, and extensive piping running between refrigeration cases in a retail area and compressors in a remote mechanical or storage area. Because of the complexity of the equipment and layout, maintaining proper and efficient operation of the refrigeration system can be difficult. Moreover, the low temperature operation can require use of refrigerants having relatively high global warming potential (GWP).

SUMMARY

This section provides a general summary of the disclosure, and is not a comprehensive disclosure of its full scope or all of its features.

In various embodiments, the present disclosure provides a refrigeration system. The refrigeration system includes at least one first compressor, at least one second compressor, a condenser, a first evaporator, a second evaporator, and a valve. The at least one first compressor is fluidly connected to a first suction line and a first discharge line. The at least one second compressor is fluidly connected to a second suction line and a second discharge line. The second suction line is fluidly connected to the first discharge line. The condenser is operable to receive refrigerant from the at least one second compressor. The first evaporator is operable to receive refrigerant from the condenser and discharge refrigerant to the first suction line. The second evaporator is operable to receive refrigerant from the condenser and discharge refrigerant to the second suction line. The valve is disposed between the first evaporator and the first suction line. The first suction line receives refrigerant from the first evaporator when the valve is in a first position. The second suction line receives refrigerant from the first evaporator when the valve is in a second position. The at least one first compressor is bypassed when the valve is in the second position.

In various other embodiments, the present disclosure provides another refrigeration system. The refrigeration system includes a first refrigeration loop and a second refrigeration loop. The first refrigeration loop includes at least one first compressor, at least one second compressor, a condenser, a first evaporator, a second evaporator, a heat exchanger, and a valve. The at least one first compressor is fluidly connected to a first suction line and a first discharge line. The at least one second compressor is compressor fluidly connected to a second suction line and a second discharge line. The second suction line is fluidly connected to the first discharge line. The condenser is operable to receive refrigerant from the at least one second compressor. The first evaporator is operable to receive refrigerant from the condenser and discharge refrigerant to the first suction line. The second evaporator is operable to receive refrigerant from the condenser and discharge refrigerant to the second suction line. The heat exchanger is operable to receive refrigerant from the condenser and discharge refrigerant to the second suction line. The valve is disposed between the first evaporator and the first suction line. The first suction line receives refrigerant from the first evaporator when the valve is in a first position. The second suction line receives refrigerant from the first evaporator when the valve is in a second position. The at least one first compressor is bypassed when the valve is in the second position. The second refrigeration loop includes at least one third compressor, the heat exchanger, and a third evaporator. The heat exchanger is operable to receive refrigerant from the third compressor. The third evaporator is operable to receive refrigerant from the heat exchanger and discharge refrigerant to the at least one third compressor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a perspective view of a micro booster refrigeration system according to the present disclosure;

FIG. 4 is a perspective view of another micro booster refrigeration system according to the present disclosure;

Corresponding reference numerals indicate corresponding parts throughout the several views of the drawings.

DETAILED DESCRIPTION

Example embodiments will now be described more fully with reference to the accompanying drawings.

Figure 1:
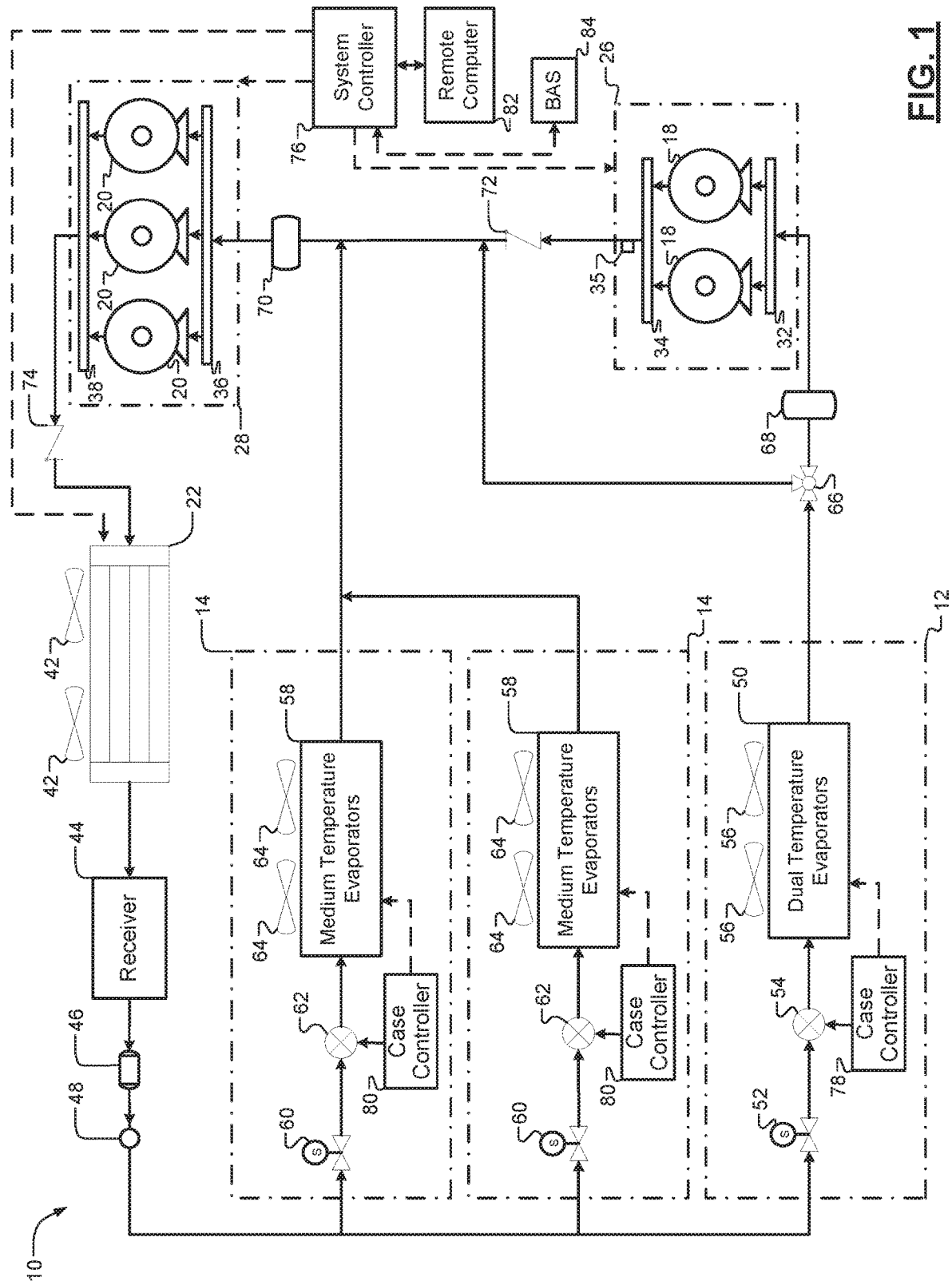
FIG. 1 is a schematic of a micro booster refrigeration system according to the present disclosure.

With reference to FIG. 1, an example micro booster supermarket refrigeration system 10 is provided. The micro booster supermarket refrigeration system 10 includes at least one dual temperature refrigeration case 12 that can be run at low temperatures or medium temperatures and at least one medium temperature refrigeration case 14 that can be run at medium temperatures. Although FIG. 1 depicts one dual temperature refrigeration case 12 and two medium temperature refrigeration cases 14, the refrigeration system 10 can be configured as large or small as needed. Thus, other numbers of dual and medium temperature refrigeration cases 12, 14 are contemplated within the scope of the present disclosure. Low temperatures may be used for frozen foods and medium temperatures can be used for meat and dairy, by way of non-limiting example. The dual and medium temperature refrigeration cases 12, 14 may be disposed in a retail area.

The refrigeration system 10 further includes at least one first compressor 18, at least one second compressor 20, and a condenser 22. The first compressors 18 may be disposed on a first compressor rack 26. The second compressors may be disposed on a second compressor rack 28. The compressors 18, 20 may be fixed capacity or variable capacity compressors. For example, each compressor rack 26, 28 may include at least one variable capacity compressor and at least one fixed capacity compressor.

The first compressors 18 may be connected by a first suction header or manifold 32 and a first discharge header or manifold 34. A first discharge temperature sensor 35 may be disposed downstream of the first discharge header 34 to detect a temperature of refrigerant vapor exiting the first compressors 18. The second compressors 20 may be connected by a second suction header or manifold 36 and a second discharge header or manifold 38. When single first or second compressors 18, 20 are used, the suction and discharge headers or manifolds 32, 36, 34, 38 can be the suction and discharge inlets, respectively, connected to the suction and discharge lines, respectively. The first compressor rack 26 may be connected in series with the second compressor rack 28 such that the refrigerant discharged from the first compressor rack 26 is received on a suction side of the second compressor rack 28.

The first compressors 18 receive a refrigerant vapor having a first or low pressure and discharge a refrigerant vapor having a second or intermediate pressure. The second pressure is higher than the first pressure. The second compressors 20 receive the second or intermediate pressure refrigerant vapor from the first compressors 18 and discharge a refrigerant vapor having a third or high pressure. The third pressure is higher than the second pressure. As will be discussed in greater detail below, the first compressors 18 may discharge refrigerant vapor directly into the second compressors 20.

The condenser 22 receives the high pressure refrigerant vapor from the second compressor rack 28. The condenser 22 may include one or more fans 42. The condenser 22 removes heat from the high pressure refrigerant vapor and discharges a high pressure, low temperature refrigerant liquid. The refrigerant is received by a receiver 44. The receiver 44 discharges the refrigerant to a filter-drier 46 to remove moisture, dirt, metal, and other impurities. The filter-drier 46 discharges refrigerant to a sight glass 48, which indicates refrigerant level. Refrigerant discharged from the sight glass 48 is received by the dual temperature refrigeration case 12 and the medium temperature refrigeration cases 14. The receiver 44, filter-drier 46, and sight glass 48 may be omitted from the refrigeration system 10 within the scope of the present disclosure.

The dual temperature refrigeration case 12 can be operated within a first or low temperature range or a second or medium temperature range that is higher than the first temperature range. The dual temperature refrigeration case 12 includes an evaporator 50, a solenoid valve 52, an expansion valve 54, and one or more fans 56. The medium temperature cases 14 can be operated within the second or medium temperature range. The medium temperature refrigeration cases 14 each include an evaporator 58, a solenoid valve 60, an expansion valve 62, and one or more fans 64. The solenoid valves 52, 60, which receive refrigerant from the sight glass 48, may be used to prevent backflow. The expansion valves 54, 62 receive refrigerant from respective solenoid valves 52, 60. The expansion valves 54, 62 receive a high pressure liquid and decrease the pressure of the refrigerant to discharge a low pressure liquid. The expansion valves 54, 62 are used to control the amount of refrigerant that is discharged to the respective evaporators 50, 58. Thus, the expansion valves 54, 62 are used to control the temperature ranges of the dual and medium temperature refrigeration cases 12, 14, respectively. The expansion valves 54, 62 may be thermostatic expansion valves (TXV), pulse type solenoids, or electronic expansion valves (EXV), by way of non-limiting example.

The evaporators 50, 58 receive low pressure refrigerant liquid from the respective expansion valves 54, 62 and discharge low pressure refrigerant vapor. More specifically, the liquid refrigerant enters the evaporators 50, 58 and absorbs heat from the respective refrigeration case 12, 14 to vaporize.

Refrigerant discharged from the evaporator 50 of the dual temperature refrigeration case 12 is received by a bypass valve 66, which may be a 3-way ball valve. When the bypass valve 66 is in a first position, it discharges refrigerant to a first accumulator 68 upstream of the first compressors 18. When the bypass valve 66 is in a second position, it discharges refrigerant to the suction header 36 of the second compressor rack 28. Thus, in the first position, the bypass valve 66 is used to run the dual temperature refrigeration case 12 within a low temperature range. In the second position, the bypass valve 66 is used to bypass the first compressor rack 26, thereby enabling operation of the dual temperature refrigeration case 12 within a medium temperature range. Although a bypass valve 66 is shown as a 3-way valve, other configurations to enable bypass of the first compressors 18, such as a series of solenoid valves, are contemplated within the scope of the present disclosure.

The first accumulator 68 receives refrigerant from the bypass valve 66 when the bypass valve 66 is in the first position. The first accumulator 68 discharges refrigerant to the first suction header 32 of the first compressor rack 26.

The first accumulator 68 is used to prevent liquid refrigerant from flowing to the first compressors 18.

Refrigerant discharged from the evaporators 58 of the medium temperature refrigeration cases 14 is received by a second accumulator 70 upstream of the second compressors 20. The second accumulator 70 prevents liquid refrigerant from flowing to the second compressors 20. The second accumulator 70 discharges refrigerant to the suction header 36 of the second compressor rack 28.

The refrigeration system 10 may include various valves controlled by various associated controllers, to monitor and regulate the various temperatures and pressures within the refrigeration system 10 to maintain efficient and desirable operation. Specifically, the refrigeration system includes check valves 72, 74 disposed downstream of the first and second compressors 18, 20, respectively, to prevent backflow to the compressors 18, 20. The refrigeration system 10 may also include additional valves (not shown), such as solenoid valves, evaporator pressure regulator (EPR) valves, or electronic evaporator pressure regulator (EEPR) valves. For example, EPR valves may be used downstream of the medium temperature refrigeration cases 14 to operate the medium temperature refrigeration cases 14 at different temperatures within the medium temperature range. The valves shown in FIG. 1 are merely exemplary, and other types of valves may be used within the scope of the present disclosure. Moreover, certain valves may be omitted from the refrigeration system 10.

The first discharge header 34 of the first compressors 18 discharges to the second suction header 36 of the second compressors 20. Thus, the first compressors 18 do not compress the refrigerant to the highest condensing pressure, but rather to an intermediate pressure. The second compressors 20 compress the refrigerant from the intermediate pressure discharged by the first compressors 18 and the medium temperature evaporators 58 to a high pressure or condensing pressure. The relatively low discharge pressure of the first compressors 18 enables the use of medium temperature compressors in the first compressor rack 26. The associated relatively low discharge temperature of the first compressors 18 eliminates the need for a desuperheater, such as liquid injection, or any other means of cooling, resulting in a cost savings. Although the dual temperature refrigeration case 12 is capable of cooling within a low temperature range, all loads on the system are treated as medium loads from the perspective of the second compressor rack 28.

The compression ratio of the first compressors 18 is low as compared to a low temperature compressor for a non-booster low temperature refrigeration system. The compression ratio for the first compressors may by greater than or equal to about two (2) and less than or equal to about three (3), by way of non-limiting example. The compression ratio for the second compressors may be greater than or equal to about four (4) and less than or equal to about five (5), by way of non-limiting example. Because all compressors 18, 20 operate at relatively low compression ratios, maintenance and operation of the refrigeration system 10 is simplified compared to a non-booster refrigeration system with separate low temperature and medium temperature refrigeration cycles.

Unlike refrigeration systems that use a secondary refrigerant, such as glycol, the refrigeration system 10 of the present disclosure may be operated without pumps and certain other complexities. Moreover, the refrigeration system 10 uses a single refrigerant for both the low temperature and high temperature operations. Various refrigerants may be used in the refrigeration system 10. In contrast to a non-booster refrigeration with separate low temperature and medium temperature refrigeration cycles, a low pressure refrigerant may be used. Suitable low pressure refrigerants include R-134a, R-450A, R-513A, and R-515A, by way of non-limiting example. Low pressure refrigerants generally have relatively low GWPs. Thus, the use of low pressure refrigerants in the refrigeration system 10 of the present disclosure may result in lower direct emissions compared to other refrigeration systems. Moreover, higher displacement compressors having higher efficiencies can be used with low pressure refrigerants. Finally, the low temperature refrigerant circulated in the refrigeration system 10 may also be used in other refrigeration systems throughout the store. Although the use of specific low pressure refrigerants is discussed above, the refrigeration system 10 may be used with other refrigerants, including other low pressure refrigerants and non-low pressure refrigerants.

The dual temperature refrigeration case 12 may be used as a low temperature refrigeration case operating within a first temperature range or a medium temperature case operating within a second temperature range that is higher than the first temperature range. The medium temperature refrigeration cases 14 operate within the medium temperature range. The dual temperature refrigeration case 12 may be toggled from operation within the first or low temperature range to operation within the second or medium temperature range by shutting off and bypassing the first compressors 18 by placing the bypass valve 66 in the first position.

The compressors 18, 20 can include scroll compressors, reciprocating compressors, or rotary vane compressors, for example, and/or any other type of compressor. Scroll compressors generally operate efficiently at low condensing pressures. Thus, scroll compressors are particularly suitable as first compressors 18. Because of the low condensing capability, scroll compressors operate at corresponding low discharge temperatures. The use of scroll compressors as first compressors 18 is advantageous in the micro booster refrigeration system 10 because it may eliminate the need for a desuperheater or other means of cooling at the first discharge header 34. In contrast, when a compressor operating at higher discharge temperatures and pressures is used as the first compressor 18, a desuperheater (not shown) is typically disposed downstream of the first compressor 18 and upstream of the second compressor 20 to lower the refrigerant temperature before it enters the second suction header 36.

One or more of the first compressors 18 and/or the second compressors 20 may be a variable capacity compressor. A variable capacity compressor may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressors 18, 20 could include any other additional or alternative structure for varying its capacity and/or the operating capacity of the refrigeration system 10. As will be discussed in greater detail below, the first compressors 18 generally operate a predictable suction and discharge pressures. Variable capacity compressors may nonetheless be useful in circumstances where loads vary. For example, loads on the first compressor 18 may vary during a defrost operation of the dual temperature evaporator 50.

Although a single dual temperature refrigeration case 12 is shown, the refrigeration system 10 may alternatively include a plurality of dual temperature refrigeration cases 12. The first compressor rack 26 may be disposed in a retail area near the dual temperature refrigeration cases 12. For example, the dual temperature refrigeration case 12 may be disposed adjacent to, on top of, or inside of one of the dual temperature refrigeration cases 12. The first compressor rack 26 may be used to cool the entire plurality of dual temperature refrigeration cases 12. The second compressor rack 28 may be located in a remote area away from the retail area. For example, the second compressor rack 28 may be disposed in a mechanical room, in a storage room, or on a roof.

The refrigeration system 10 may require only a single set of pipes to run from the first compressor rack 26 in the retail area to the second compressor rack 28 in the remote area. Because of the relatively low discharge temperature of the first compressors 18, medium temperature refrigerant pipes may be used. Thus, the equipment and installation costs of the refrigeration system 10 may be reduced when compared to a direct expansion system having both low and medium temperature refrigeration pipes running between the retail area and the remote area. Equipment and operation costs are also improved compared to a secondary system employing pumps and heat exchangers and to a micro-distributed system requiring distinct compressors for both low temperature and medium temperature loads. Finally, efficiency of the refrigeration system 10 is improved compared to other refrigeration system because of the decrease in equipment, minimizing energy losses, and the decrease in piping, minimizing pressure drop between refrigeration stages.

The refrigeration system 10 includes various controllers that monitor operating and environmental conditions, including temperatures and pressures, and control the various system components according to programmed control strategies. Specifically, a system controller 76 controls the compressor racks 26, 28 by activating, deactivating, and adjusting the compressors 18, 20 of the compressor racks 26, 28. The system controller 76 also controls the condenser 22 by activating, deactivating, and adjusting fans 42 of the condenser 22. The system controller 76 may be, for example, an Einstein RX Refrigeration Controller, an Einstein BX Building/HVAC Controller, an E2 RX Refrigeration Controller, an E2 BX HVAC Controller, or an E2 CX Convenience Store Controller, available from Emerson Climate Technologies Retail Solutions, Inc., of Kennesaw, Ga., or a compressor rack controller, such as the XC series controller, available from Dixell S.p.A., of Pieve d'Alpago (Belluno), Italy, with appropriate programming in accordance with the present disclosure. Alternatively, the first rack 26 may have a separate controller (not shown) that is not operated by the system controller 76.

The system controller 76 may include a user interface, such as a touchscreen or a display screen and user input device, such as a keyboard, to communicate with a user. For example, the system controller 76 may output system parameters, such as system operating temperatures or pressures, and/or system set points to a user. Further, the system controller 76 may receive user input modifying the system set points or control algorithms.

The refrigeration system 10 also includes case controllers 78, 80 for controlling the dual temperature evaporators 50 and medium temperature evaporators 58 and the associated expansion valves 54, 62. For example, the case controllers 78, 80 may activate, deactivate, and adjust the evaporator fans of the evaporators 24, 26. The case controllers may also adjust the expansion valves 54, 62. The case controllers 78, 80 may be XM678 Case Controllers, available from Dixell S.p.A., of Pieve d'Alpago (Belluno), Italy, with appropriate programming in accordance with the present disclosure. Further, the case controllers 78, 80 may include a user interface, such as a touchscreen or a display screen and user input device, such as a keyboard, to communicate with a user. For example, the case controllers 78, 80 may output system parameters, such as system operating temperatures or pressures, and/or system set points to a user. Further, the case controllers 78, 80 may receive user input modifying the system set points or control algorithms.

Each of the controllers shown in FIG. 1 is operable to communicate with each other. For example, the system controller 76 may adjust operation or set points of the case controllers 78, 80.

Additionally, a remote computer 82 may be connected to the system controller 76 so that a remote user can log into the system controller 76 and monitor, control, or adjust operation of any of the controllers, including the system controller 76 and the case controllers 78, 80.

Additionally, the system controller 76 may be in communication with a building automation system (BAS) 84. The BAS 84 may be connected to additional temperature and pressure sensors and may monitor and store additional temperature and pressure data that can be accessed by the system controller 76 in the event of a sensor failure. The remote computer 82 can also be connected to the BAS 84 so that a remote user can log into the BAS 84 and monitor, control, or adjust operation of any of the controllers, including the system controller 76 and the case controllers 78, 80.

Although system controller 76 and case controllers 78, 80 are shown in FIG. 1, various controller configurations may be used within the scope of the present disclosure. Control can occur anywhere in the refrigeration system 10. Thus, the controls for the refrigeration system 10 can be accomplished with centralized control or distributed controls. In distributed control systems, case control can be accomplished with either temperature or pressure controls.

The refrigeration system 10 may include compressor synchronization. For example, the system controller 76 may monitor a pressure of the second suction header 36 or the first discharge header 34 and turn on the second compressors 20 when the pressure of the second suction header 36 or the first discharge header 34 exceeds a predetermined value. The predetermined value is set such that it indicates that the first compressors 18 are running.

Digital compressors may be used to facilitate capacity control. If digital compressors are used for first or second compressors 18, 20, the first and second compressors 18, 20 can be synchronized with associated expansion valves 54, 62 to minimize pressure fluctuations and achieve better temperature and pressure control. Operation of the first compressor rack 26 can be synchronized back to the second compressor rack 28 to optimize proper modulation of the compressors 18, 20. The second compressors 20 can be closely modulated to maintain stable pressures by controlling the second compressors 20 based on a detected temperature of the dual temperature refrigeration case 12, a detected temperature of the medium temperature refrigeration case 14, or a detected temperature of the first discharge header 34. Quicker reaction control is enabled by minimal piping of the refrigeration system 10 of the present disclosure compared to other refrigeration systems.

Control of the dual temperature refrigeration case 12 can be achieved using a supervisory or other control that can shut off the first compressors 18 and open the bypass valve 66. The control would also change the temperature range of the dual temperature refrigeration case 12 and make the appropriate adjustments to the expansion valve 54 to control case temperature and proper superheat.

The system controller 76 may generate an alarm to indicate that maintenance is necessary. The system controller 76 may determine that maintenance is necessary based on detected conditions of the first compressors 18. Detected conditions of the first compressors 18 may be used to identify potential maintenance issues because the suction and discharge pressures of the first compressors 18 are predictable in the micro booster configuration of the refrigeration system 10.

Compressors in a supermarket refrigeration system, such as the first compressors 18 and the second compressors 20, typically run at predictable suction pressures. A first suction pressure of the first compressors 18 is determined by a saturated suction temperature requirement of the lowest temperature first refrigeration case 12 connected to the first compressor rack 26. Likewise, a second suction pressure of the second compressor 20 is determined by a saturation suction temperature requirement of the lowest temperature second refrigeration case 14 connected to the second compressor rack 28. Thus, in a typical non-booster refrigeration system, a change in compression ratio results from a change in discharge pressure rather than a change in suction pressure.

In a non-booster system, compressors typically discharge under ambient conditions. Ambient conditions are subject to change, particularly when the compressors discharge outside (e.g., to a rooftop condenser) and are subjected to a variety of environmental conditions. For example, when an ambient temperature is higher, such as in the summer, discharge conditions and compression ratio will be correspondingly higher. In contrast, when ambient temperature is lower, such as in the winter, discharge conditions and compression ratio will be correspondingly lower. Because of fluctuating discharge conditions, compressors in a non-booster refrigeration system may operate within a relatively large operating map (i.e., operating conditions).

An operating map for the first compressors 18 in the micro booster refrigeration system 10 may be relatively small compared to a compressor in a non-booster refrigeration system. Unlike a compressor of a non-booster refrigeration system, the first compressor 18 also operates at a predictable discharge pressure in addition to a predictable suction pressure. A first discharge pressure of the first compressor 18 is the substantially the same as a second suction pressure of the second compressor 20. As discussed above, suction pressure of the second compressor 20 is predictable. For example, the second suction pressure may be greater than or equal to about 15° F. to less than or equal to about 30° F. Thus, because the first discharge pressure is substantially the same as the second suction pressure, the first discharge pressure is likewise predictable.

Figure 2:
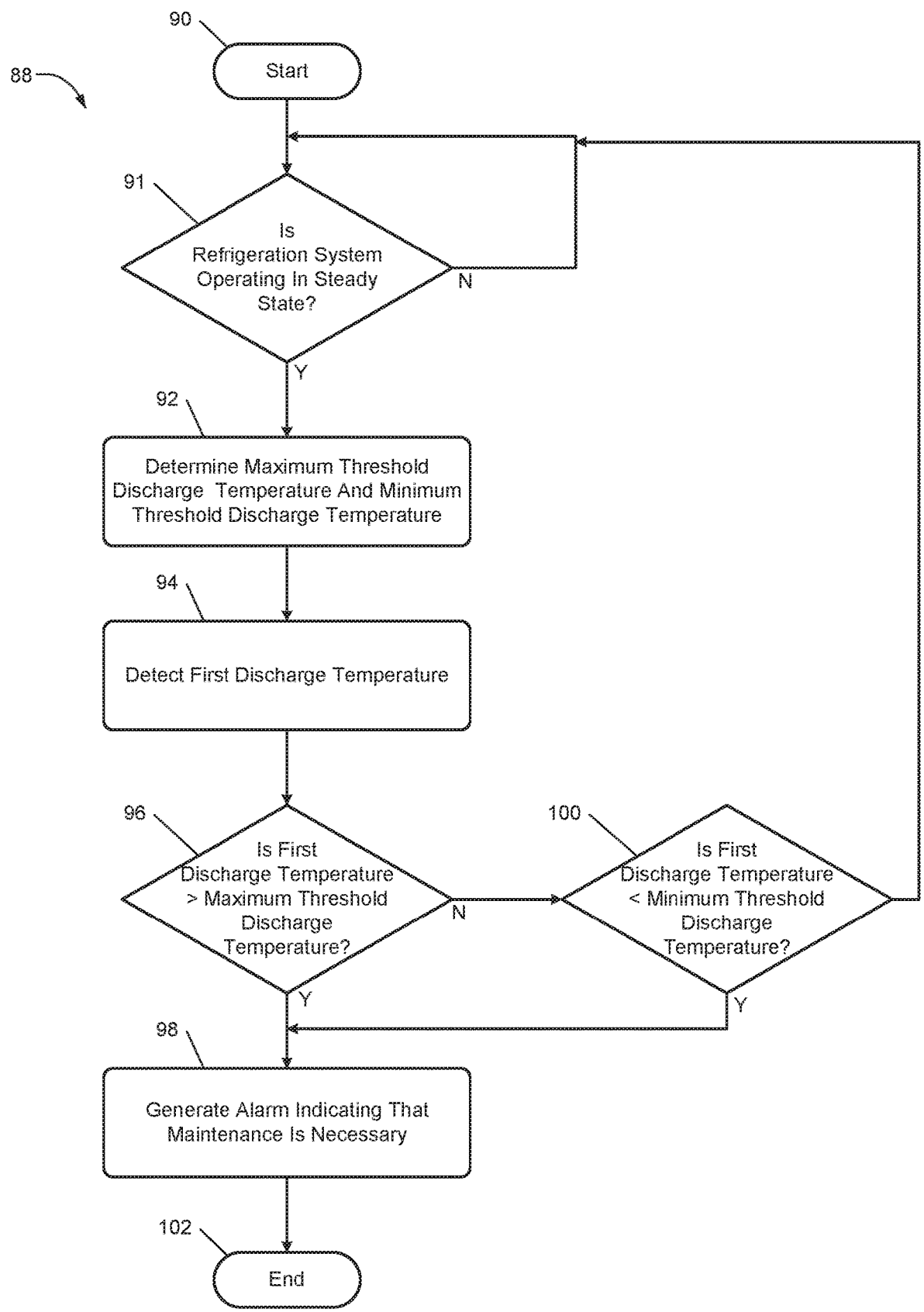
FIG. 2 is a flowchart for a control algorithm for the micro booster refrigeration system of FIG. 1.

The first compressors 18 operate at predictable first suction and first discharge pressures independent of ambient temperature or load the first compressor 18 during steady state operation of the refrigeration system 10. As such, discharge conditions can be used to identify when maintenance is necessary. With reference to FIG. 2, a control algorithm 88 is shown for diagnosing a maintenance issue. The control algorithm 88 may be performed by the system controller 76. The system controller 76 may output appropriate control signals to the first compressors 18, the second compressors 20, the bypass valve 66, the first expansion valve 54, or the second expansion valve 62, by way of non-limiting example.

The control algorithm 88 begins at 90. At 91, the system controller 76 determines whether the refrigeration system 10 is operating in steady state. The refrigeration system 10 does not operate during steady state, for example, during start up. At 92, the system controller 76 determines a maximum threshold discharge temperature and a minimum threshold discharge temperature. The maximum threshold discharge temperature and the minimum threshold discharge temperature may be predicted based on the compressor model, the refrigerant used, and the first suction and discharge pressures. The maximum threshold discharge temperature and the minimum threshold discharge temperature may be predetermined based on an algorithm, for example. The suction and discharge pressures may be set points. Alternatively, the first suction pressure and the first discharge pressure may be detected by a respective first suction pressure sensor and a first discharge pressure sensor (not shown). The method continues at 94.

At 94, the system controller 76 receives a first discharge temperature from the first discharge temperature sensor 35 disposed downstream of the first discharge header 34. The first discharge temperature is an actual temperature of refrigerant exiting the first compressors. At 96, the system controller 76 determines whether the first discharge temperature is greater than the maximum threshold discharge temperature. If the discharge temperature is greater than the maximum threshold discharge temperature, the method continues at 98. Otherwise, the method continues at 100. At 100, the system controller 76 determines whether the first discharge temperature is less than the minimum threshold discharge temperature. If the first discharge temperature is less than the minimum threshold discharge temperature, the method continues at 98. Otherwise, the method returns to 92.

At 98, the system controller 76 controls the remote computer 82 to generate an alarm indicating that maintenance is necessary. The system controller 76 may alternatively control a user interface device (UID) (not shown) located near the first compressors 18 to generate a warning indicating that maintenance is necessary. For example, the may be at least one of a visual message (e.g., text, light) or an audible message (e.g., bell) indicating that maintenance is necessary.

In various implementations, the system controller 76 may also control one or more of the first compressors 18, the second compressors 20, the bypass valve 66, the first expansion valve 54, or the second expansion valve 62, to take corrective action in response to the alert that maintenance is necessary. For example, the system controller 76 may control the bypass valve 66 to direct refrigerant to the second suction header 36, bypassing the first compressors 18, in response to the alarm. In another example, the system controller 76 may shut down one or more components of the refrigeration system 10 in response to the alarm. The method ends at 102.

In various implementations, step 91 may be omitted so that the system controller 76 does not determine whether the refrigeration system 10 is operating in steady state. Instead, the system controller 76 may perform steps 92, 94, 96, 98, 100, 102 regardless of whether the refrigeration system 10 is operating in steady state. If the operator determines that an alarm was caused by transient operation, such as during startup of the refrigeration system, the operator can manually override the alarm.

Referring to FIG. 3, a refrigeration system 10a may include a plurality of first or dual temperature refrigeration cases 12a and a plurality of second or medium temperature refrigeration cases 14a. The refrigeration system 10a may further include a plurality of first compressors 18a, a plurality of second compressors 20a, and a condenser 22a. The first compressors 18a may have a distributed configuration. More specifically, the first compressors 18a may be located in the retail space, for example, on the respective dual temperature refrigeration cases 12a. The first compressors 18a may alternatively be disposed under the dual temperature refrigeration cases 12a, adjacent to the dual temperature refrigeration cases 12a, or attached to the dual temperature refrigeration cases 12a (not shown). Due to space constraints in the retail space, low height compressors may be particularly suitable as first compressors 18a in the refrigeration system 10a of this configuration.

The second compressors 20a may be located on a second compressor rack 28a. The second compressor rack 28a and the condenser 22a may be located on a roof 29a. The second compressor rack 28a and the condenser 22a may alternatively be located in another remote area separate from the retail space, such as a mechanical room or a storage area.

Referring now to FIG. 4, a refrigeration system 10b may include a plurality of first or dual temperature refrigeration cases 12b and a plurality of second or medium temperature refrigeration cases 14b. The refrigeration system 10b may further include a plurality of first compressors 18b and a plurality of condensing units 19b. Each condensing unit 19b includes a second compressor 20b integrated with a condenser 22b. The first compressors 18b may have a distributed configuration, similar to the first compressors 18a of FIG. 3. The condensing units 19b may also have a distributed configuration. The condensing units 19b may be located on a roof 29b. For example, each condensing unit 19b may be located above a respective second refrigeration case 14b. Alternatively, the condensing units 19b may be located on the groups outside of the retail area (not shown). In various implementations, the first compressor rack 26b may likewise be excluded and the at least one first compressor 18b may be integrated with an evaporating unit of the dual temperature refrigeration case 12b (not shown).

Figure 5:
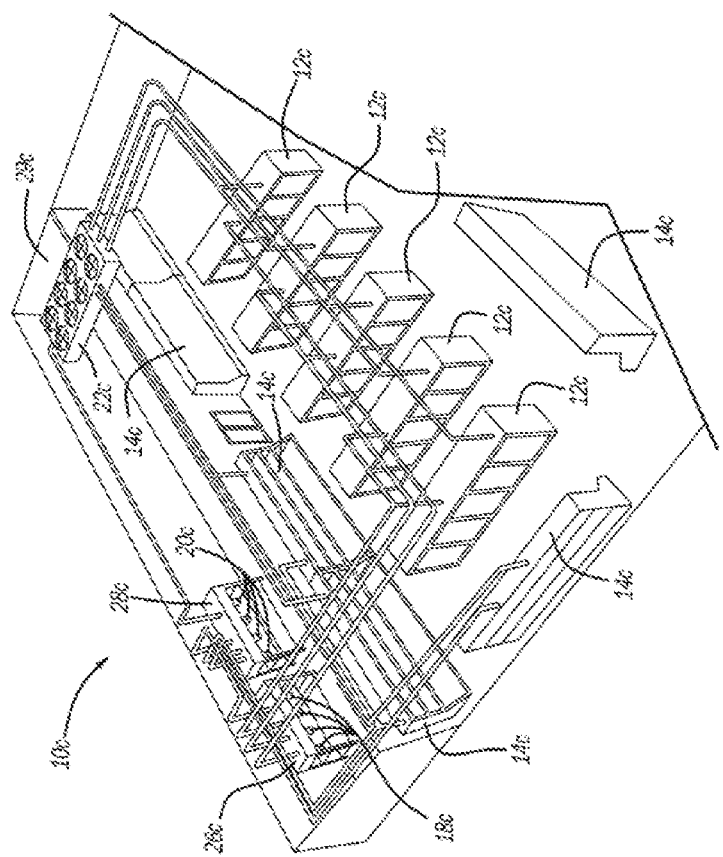
FIG. 5 is a perspective view of yet another micro booster refrigeration system according to the present disclosure.

With reference to FIG. 5, a refrigeration system 10c may include a plurality of first or dual temperature refrigeration cases 12c and a plurality of second or medium temperature refrigeration cases 14c. The refrigeration system may further include a plurality of first compressors 18c, a plurality of second compressors 20c, and a condenser 22c. The first compressors 18c may be disposed on a first compressor rack 26c. The second compressors may be disposed on a second compressor rack 28c. The first and second compressors 18c, 20c have a micro booster configuration. Thus, the first compressors 18c discharge into the second compressors 20c, similar to the first and second compressors 18, 20 of FIG. 1. The first compressor rack 26c, the second compressor rack 28c, and the condenser 22 may all be located away from the retail area. For example, the first and second compressor racks 26c, 28c may be located in a machine room or storage area. The condenser 22c may be located on a roof 29c. The configuration of the refrigeration system 10c requires additional piping and refrigerant charge when compared to the refrigeration systems 10, 10a, and 10b of FIGS. 1, 3, and 4, respectively.

Figure 6:
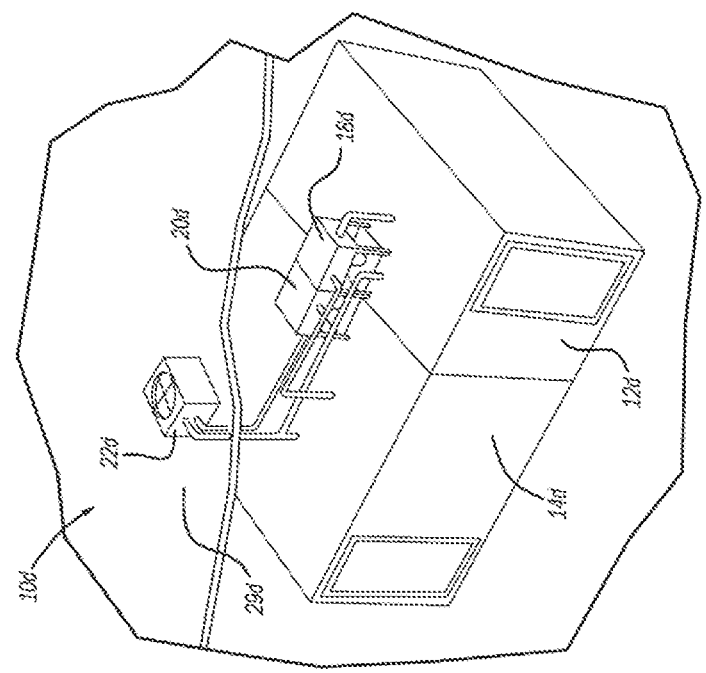
FIG. 6 is a perspective view of yet another micro booster refrigeration system according to the present disclosure.

Referring to FIG. 6, a refrigeration system 10d may include a first or dual temperature refrigeration case 12d and a second or medium temperature refrigeration case 14d. The first and second refrigeration cases 12d, 14d may be relatively small loads that are collocated next to one another. For example, the first and second refrigeration cases 12d, 14d may be a walk-in freezer and refrigerator/cooler, respectively. The refrigeration system 10d may further include a first compressor 18d, a second compressor 20d, and a condenser 22d. The first and second compressors 18d, 20d are connected in series in a booster configuration, similar to the booster configuration of the refrigeration system 10 of FIG. 1. The first and second compressors 18d, 20d may be located in the retail area, such as on top of the first and second refrigeration cases 12d, 14d. The first and second compressors 18d, 20e may be located adjacent to one another and may be provided in an integral package. The condenser 22d may be located on a roof 29d and connected downstream of and in series with the second compressor 20d.

Figure 7:
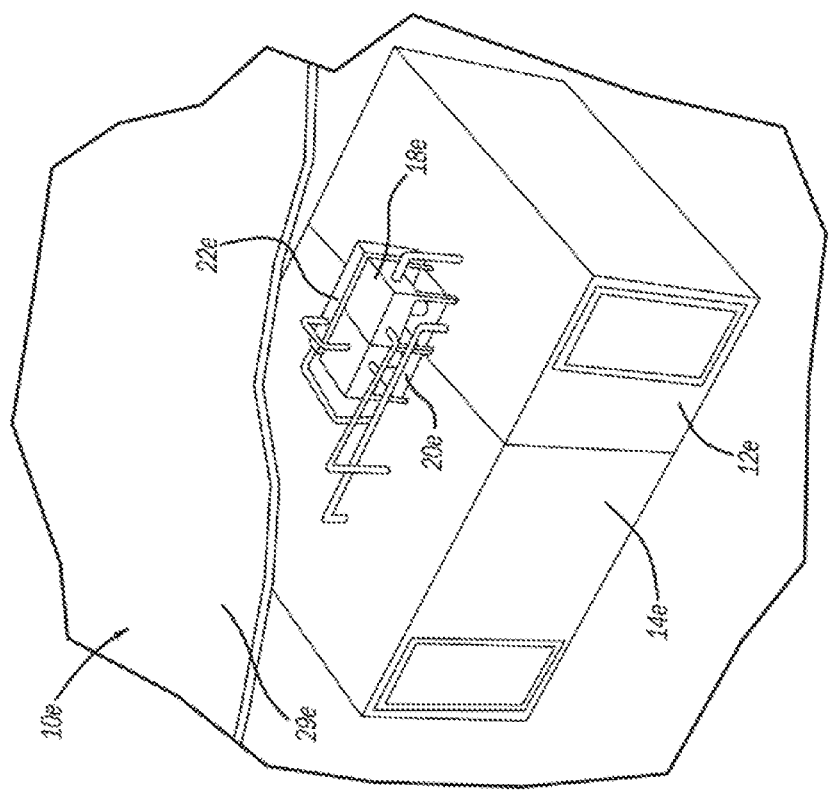
FIG. 7 is a perspective view of yet another micro booster refrigeration system according to the present disclosure.

Referring now to FIG. 7, a refrigeration system 10e may include a first or dual temperature refrigeration case 12e and a second or medium temperature refrigeration case 14e similar to the first and second refrigeration cases 12d, 12e of FIG. 6. The refrigeration system 10d may further include a first compressor 18e, a second compressor 20e, and a condenser 22e. The first compressor 18e, second compressor 18e, and condenser 22e may all be located in the retail area, such as on top of the first and second refrigeration cases 12e, 14e.

Figure 8:
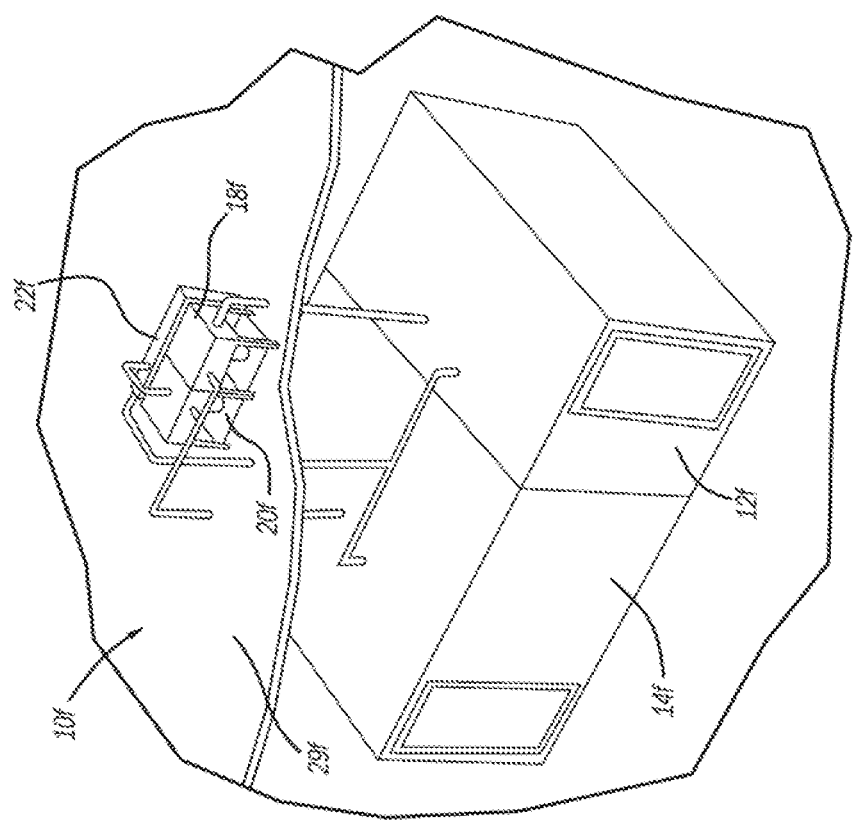
FIG. 8 is a perspective view of yet another micro booster refrigeration system according to the present disclosure.

With reference to FIG. 8, a refrigeration system 10f may include a first or dual temperature refrigeration case 12f and a second or medium temperature refrigeration case 14f similar to the first and second refrigeration cases 12d, 12e of FIG. 6. The refrigeration system 10f may further include a first compressor 18f, a second compressor 20f, and a condenser 22f. The first compressor 18f, second compressor 18f, and condenser 22f may all be located on a roof 29f.

Figure 9:
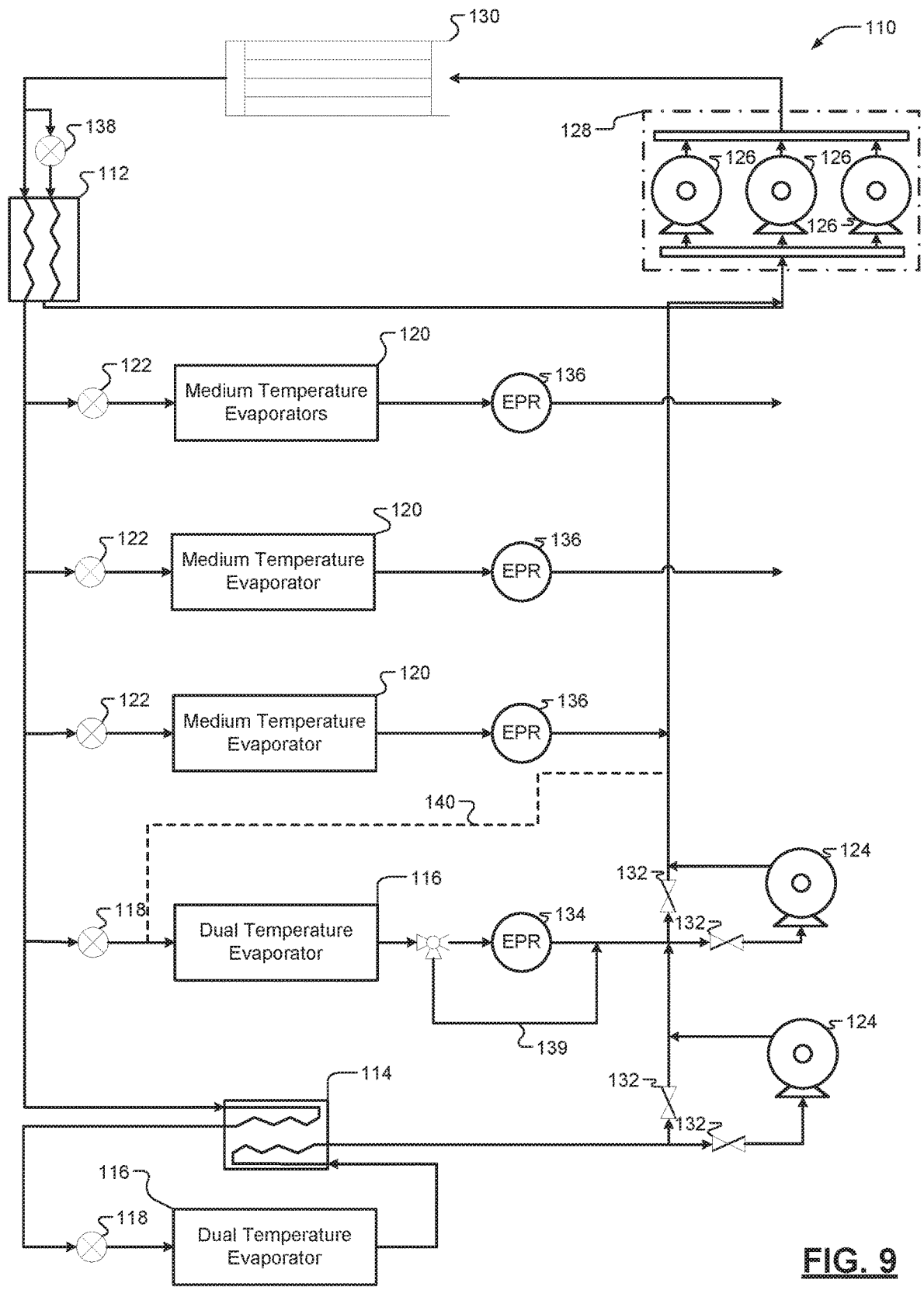
FIG. 9 is a schematic of a micro booster refrigeration system including heat exchangers for subcooling and superheat according to the present disclosure.

Referring now to FIG. 9, another example refrigeration system 110 includes heat exchangers 112, 114. The refrigeration system 110 further includes dual temperature evaporators 116 and associated expansion valves 118, medium temperature evaporators 120 and associated expansion valves 122, first compressors 124 located in the retail area near the dual temperature evaporators 116, second compressors 126 on a medium temperature compressor rack 128 in a remote location, and a condenser 130 in the remote location. The system also includes valves 132 associated with first compressors 124, a first EPR valve 134 disposed downstream of the dual temperature evaporator 116, second EPR valves 136 disposed downstream of each medium temperature evaporator 120, and an expansion valve 138 disposed adjacent to the heat exchanger 112.

The first and second EPR valves 134, 136 may be used to control pressure at the respective dual temperature and medium temperature evaporators 116, 120. For example, the EPR valves 134, 136 may control pressure at the respective evaporators 116, 120 when a suction pressure of the respective compressor 18, 20 is lower than what is needed. Refrigerant may bypass the first EPR valve 134 when the dual temperature evaporator 116 is operated at a low temperature (e.g., freezer case). In contrast, refrigerant may optionally flow through the first EPR valve 134 when the dual temperature evaporator 116 is operated at a medium temperature (e.g., refrigeration case). The first EPR valve 134 is bypassed by flowing refrigerant through a first EPR bypass line 139.

The dual and medium temperature cases can include suction line heat exchangers 112, 114 to provide liquid subcooling and to increase superheat from the cases. Because the liquid and suction lines are in close proximity inside the dual and medium temperature refrigeration cases, they can be placed in close proximity with added insulation to form the heat exchangers 112, 114.

More specifically, the heat exchanger 112 receives refrigerant from the condenser 130 and discharges refrigerant to the evaporators 116, 120. The expansion valve 138 discharges refrigerant to the heat exchanger 112 and the heat exchanger 112 discharges refrigerant to a suction header of the second compressors 126. Alternatively, the refrigeration system 110 may use a compressor capable of economized vapor injection to inject the subcooling heat exchanger refrigerant case in the middle of the compression process. Thus, subcooling results in an additional evaporator load on the second compressors 20.

The heat exchanger 114 receives refrigerant from the heat exchanger 112 that it discharges to the dual temperature evaporators 116. The dual temperature evaporators 116 discharge refrigerant to the heat exchanger 114 and the heat exchanger 114 discharges refrigerant to the first compressors 124. Superheat can be controlled by electronic or mechanical means.

A system controller (not shown) may reduce a speed of the second compressors 126 during a defrost operation of the refrigeration system 110. Defrost controls can be accomplished with either electric defrost or hot gas bypass. The medium temperature cases 120 could be defrosted with off time, electric, low temperature discharge case, or medium temperature discharge case. The dual temperature cases 116 could be defrosted with electric, low temperature discharge gas, or medium temperature exit gas ("cool gas") 140, or medium temperature discharge gas. Defrost information from the first compressors 124 could be provided to the control for the second compressor rack 128 to facilitate better control as the dual temperature cases come in and out of defrost.

Figure 10:
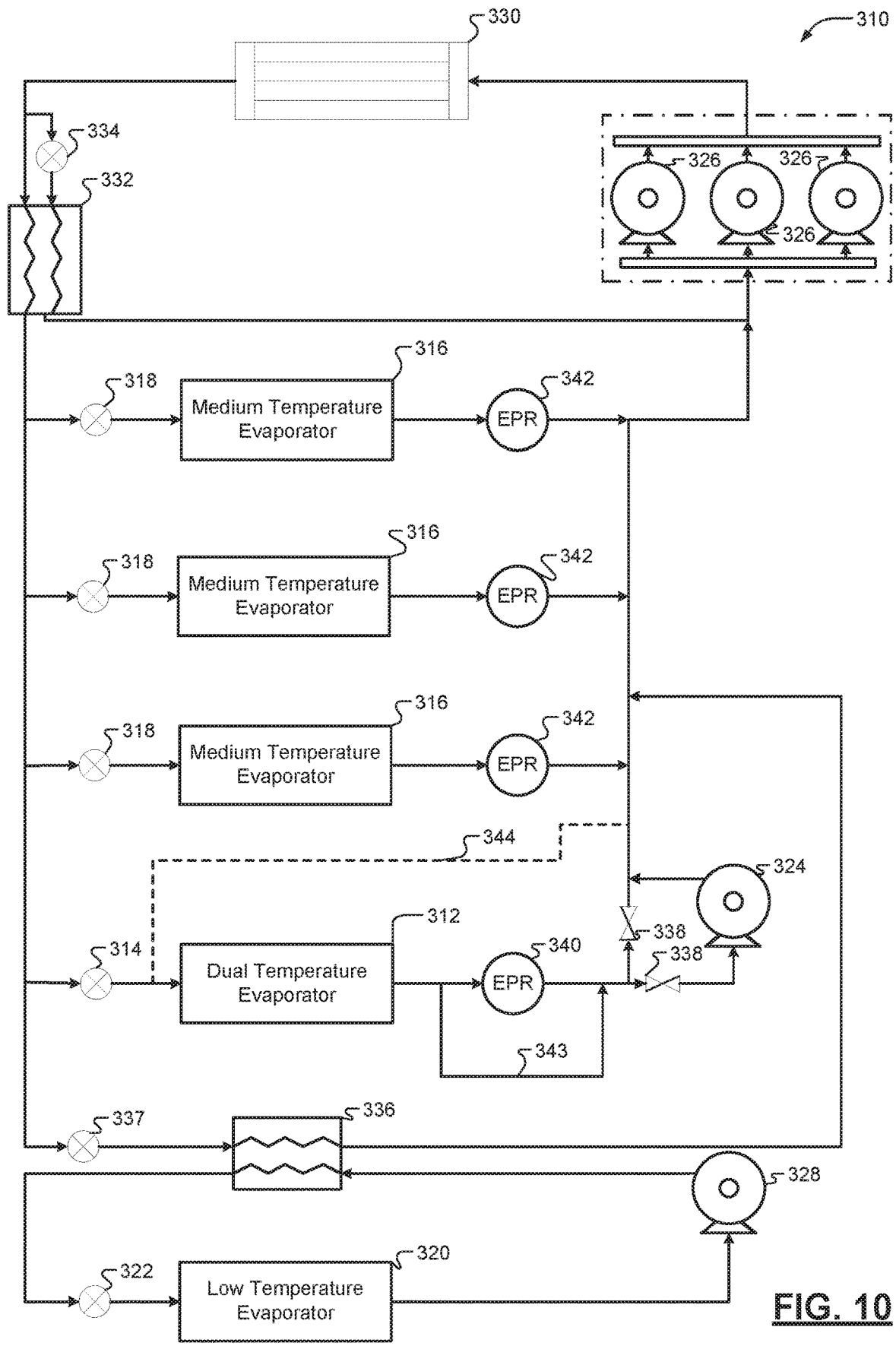
FIG. 10 is a schematic of a micro booster cascade refrigeration system according to the present disclosure.

With reference to FIG. 10, another example refrigeration system 310 is provided. The refrigeration system 310 is a micro booster cascade system. The refrigeration system 310 includes a medium temperature refrigeration loop and a low temperature refrigeration loop. The refrigeration system 310 includes at least one dual temperature evaporator 312 and associated expansion valve 314, at least one medium temperature evaporator 316 and associated expansion valve 318, and at least one low temperature evaporator 320 and associated expansion valve 322. The dual temperature evaporator 312 may be operated at low temperatures or medium temperatures. The refrigeration system 310 further includes at least one first compressor 324, at least one second compressor 326, and at least one third compressor 328. The evaporators, 312, 316, 320, the first compressor 324, and the third compressor 328 are all located in a retail area. More specifically, the first compressor 324 is disposed near the dual temperature evaporator 312 and the third compressor 328 is disposed near the low temperature evaporator 320. First and third compressors 324, 328 may be disposed on, under, adjacent to, or attached to respective refrigeration cases. First and third compressors 324, 328 may be low height compressors. The second compressors 326 and a condenser 330 are located remotely.

The medium temperature refrigeration loop comprises the dual temperature evaporator 312, the medium temperature evaporators 316, the first compressor 324, the second compressors 326, and the condenser 330. The second compressors 326 discharge refrigerant to the condenser 330. The condenser 330 discharges refrigerant to a first heat exchanger 332 similar to the heat exchanger 112 of FIG. 9. The first heat exchanger 332 includes upstream expansion valve 334. The first heat exchanger 332 discharges refrigerant to the medium temperature evaporators 316, the dual temperature evaporator 312, and a second heat exchanger 336 with an associated expansion valve 337. The dual temperature evaporator 312 discharges refrigerant to the first compressor 324. The first compressor discharges refrigerant to the second compressors 326. When the first compressor 324 is running, the dual temperature evaporator 312 is run at low temperatures. However, the first compressor 324 may be bypassed using valves 338 to operate the dual temperature evaporator at medium temperatures. First and second EPR valves 340, 342 are disposed downstream of the dual temperature and medium temperature evaporators 312, 316, respectively. Refrigerant may flow through a first EPR bypass line 343 to bypass the first EPR valve 340. The dual temperature evaporator 312 may include a cool gas defrost line 344.

The distinct low temperature refrigeration loop circulates refrigerant through the second heat exchanger 336 and into the low temperature evaporator 320. The low temperature evaporator 320 discharges refrigerant to the third compressor 328. The third compressor 328 discharges refrigerant back to the second heat exchanger 336. Thus, the low temperature load is cascaded with the medium temperature refrigerant loop. The second heat exchanger 336 transfers the condensing heat from the low temperature refrigeration loop directly to the refrigerant in the medium temperature loop. Thus, in the low temperature refrigerant loop, the second heat exchanger 336 acts as a condenser. In the medium temperature refrigerant loop, the second heat exchanger 336 acts as another medium temperature load. Because the third compressor 328 operates at a low condensing pressure and compression ratio, no additional liquid injection or cooling is necessary. Oil management is simplified in the low temperature refrigeration loop. Thus, no oil control is needed.

The low temperature refrigeration loop may use the same refrigerant or a different refrigerant than the medium temperature refrigeration loop. Optionally, because the low temperature loads and the amount of refrigerant piping are relatively small, the low temperature refrigerant loop could use hydrocarbons such as propane or A2L refrigerants. Use of these refrigerants is advantageous because they have relatively low GWPs.

A low temperature case including the low temperature evaporator 320 and the third compressor 328 is self-contained. Thus, low temperature cases can be tested and leak checked at the time of assembly in a factory prior to shipment to and installation at a retail store. Pre-shipment testing may provide a more robust and reliable product. Furthermore, installation is simplified because fewer field connections will be made in the retail store.

Figure 11:
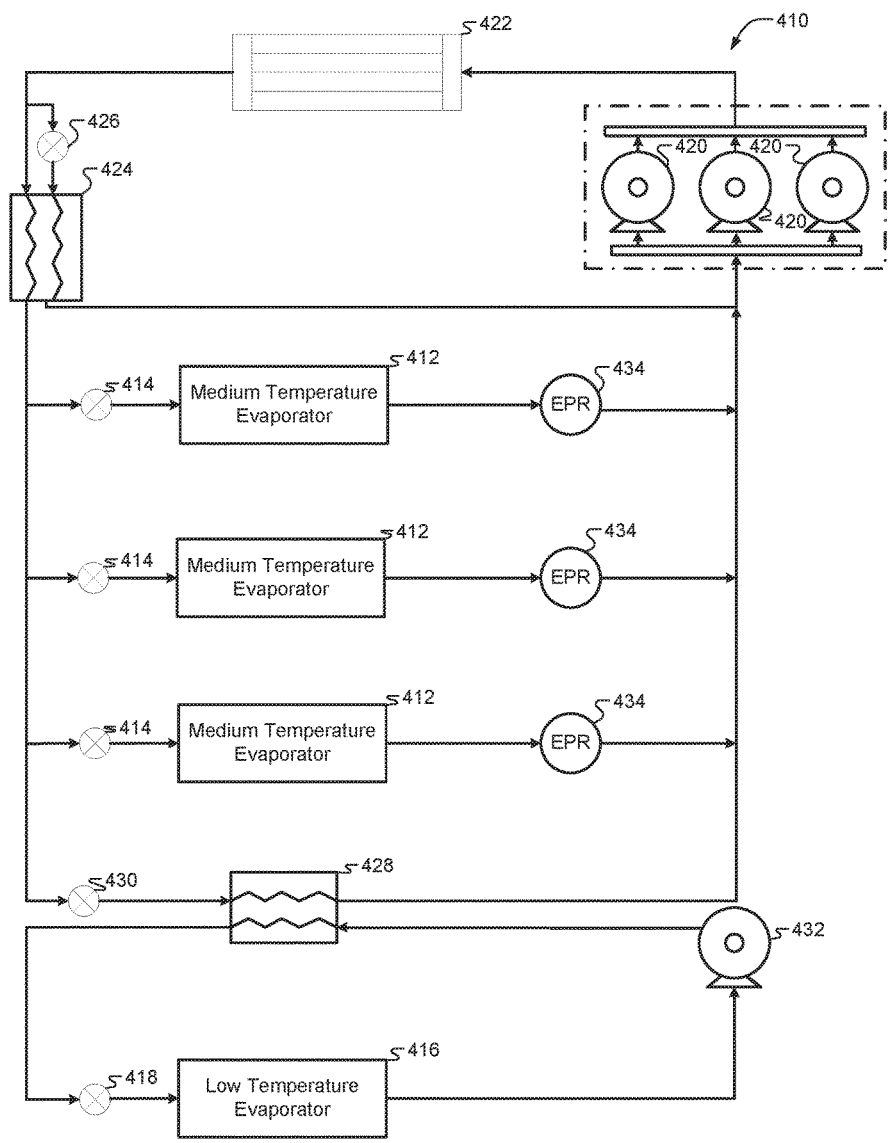
FIG. 11 is a schematic of a cascade refrigeration system according to the present disclosure.

Referring now to FIG. 11, still another example refrigeration system 410 is provided. The refrigeration system 410 is a cascade system. The refrigeration system 410 includes at least one medium temperature evaporator 412 and associated expansion valve 414 and at least one low temperature evaporator 416 and associated expansion valve 418. Similar to the refrigeration system 310 of FIG. 10, the refrigeration system 410 includes a medium temperature refrigeration loop and a low temperature refrigeration loop. The medium temperature refrigeration loop circulates refrigerant between the medium temperature evaporators 412, medium temperature compressors 420, a condenser 422, a first heat exchanger 424 and associated expansion valve 426, and a second heat exchanger 428 and associated expansion valve 430. The low temperature refrigeration loop circulates refrigerant between the low temperature evaporator 416, a low temperature compressor 432, and the second heat exchanger 428. EPR valves 434 are disposed downstream of the respective medium temperature compressors 420.

The second heat exchanger 428 has a similar function to the heat exchanger 336 of FIG. 9. More specifically, the low temperature load is cascaded with the medium temperature refrigerant loop. The second heat exchanger 428 transfers the condensing heat directly to the refrigerant in the medium temperature loop. In the low temperature refrigerant loop, the second heat exchanger 428 acts as a condenser. The refrigeration system 410 offers similar advantages to the refrigeration system 310 of FIG. 10. Specifically, lower GWP refrigerants may be used in the low temperature refrigeration loop, no liquid injection or other cooling is required, and low temperature cases can be assembled and tested prior to shipment to a retail store.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A refrigeration system comprising:
   at least one first compressor fluidly connected to a first suction line and a first discharge line;
   at least one second compressor fluidly connected to a second suction line and a second discharge line, the second suction line being fluidly connected to the first discharge line;
   a condenser operable to receive refrigerant from the at least one second compressor;
   an expansion valve operable to receive refrigerant from the condenser;
   a first evaporator operable to receive refrigerant from the expansion valve and discharge refrigerant to the first suction line;
   a second evaporator operable to receive refrigerant from the condenser and discharge refrigerant to the second suction line;
   a first refrigeration case operable to be cooled by the first evaporator within a first temperature range or a second temperature range, the first temperature range being lower than the second temperature range;
   a second refrigeration case operable to be cooled by the second evaporator within the second temperature range;
   a bypass valve disposed between the first evaporator and the first suction line; and
   a controller adapted to:
      cool the first refrigeration case within the first temperature range by adjusting the expansion valve, operating the at least one first compressor, and moving the bypass valve to a first position in which the first suction line receives refrigerant from the first evaporator, and cool the first refrigeration case within the second temperature range by adjusting the expansion valve, stopping operation of the at least one first compressor, and moving the bypass valve to a second position in which the second suction line receives refrigerant from the first evaporator and the at least one first compressor is bypassed.

2. The refrigeration system of claim 1, further comprising:
a first evaporator pressure regulator (EPR) valve disposed downstream of the first evaporator, the first EPR valve being operable to be bypassed when the first refrigeration case is cooled within the first temperature range; and
a second EPR valve disposed downstream of the second evaporator.

3. The refrigeration system of claim 1, wherein the first refrigeration case, the second refrigeration case, and the at least one first compressor are disposed within a retail space.

4. The refrigeration system of claim 3, wherein the at least one first compressor is at least one of disposed within the first refrigeration case, disposed on the first refrigeration case, disposed under the first refrigeration case, disposed adjacent to the first refrigeration case, or attached to the first refrigeration case.

5. The refrigeration system of claim 3, wherein the at least one second compressor and the condenser are both disposed outside of a retail space.

6. The refrigeration system of claim 1, wherein:
the first refrigeration case and the second refrigeration case are disposed directly adjacent to one another within a retail space;
the first refrigeration case comprises a walk-in freezer; and
the second refrigeration case comprises a walk-in cooler.

7. The refrigeration system of claim 6, wherein the at least one first compressor, the at least one second compressor, and the condenser are all disposed within the retail space.

8. The refrigeration system of claim 1, wherein the at least one first compressor is adapted to operate at a first compression ratio and the at least one second compressor is adapted to operate at a second compression ratio that is greater than the first compression ratio.

9. The refrigeration system of claim 8, wherein the first compression ratio is greater than or equal to two (2) and less than or equal to three (3).

10. The refrigeration system of claim 1, further comprising a refrigerant having a global warming potential (GWP) of less than or equal to 1500.

11. The refrigeration system of claim 10, wherein the refrigerant has a GWP of less than or equal to 600.

12. The refrigeration system of claim 1, further comprising a refrigerant selected from a group consisting of R-134a, R-450A, R-513A, and R-515A.

13. The refrigeration system of claim 1, wherein the at least one first compressor comprises a scroll compressor.

14. The refrigeration system of claim 1, wherein the at least one first compressor comprises a variable-capacity compressor.

* * * * *